Patented Apr. 8, 1947

2,418,603

UNITED STATES PATENT OFFICE 2,418,603

METHOD OF PREPARING ESTRADIOL FROM EQUILIN AND INTERMEDIATES OBTAINED THEREBY

Erwin Schwenk, Montclair, N. J., and Edith Bloch and Bradley Whitman, New York, N. Y., assignors to Schering Corporation, Bloomfield, N. J., a corporation of New Jersey No Drawing. Application February 5, 1941, Serial No. 377,482

15 Claims. (Cl. 260—397.4)

The present invention relates to the preparation of estradiol and derivatives thereof from equilin, its dihydro derivative and substitution products, and from similar steroid compounds having oxygen directly attached to nuclear carbon in ring B; and relates in particular to the conversion of equilin into certain intermediate oxygenated compounds from which estradiol and its derivatives of high estrogenic activity can be readily obtained.

It is the general object of the invention to convert the less active follicular hormone equilin, which is obtainable in considerable amounts, and its dihydro, ester, and other derivatives, into the estrogenically very efficacious estradiol, which itself, or else in the form of its derivatives, particularly its esters and ethers, has found wide-spread therapeutic use in the treatment of female disorders.

Serini and Logemann have reported (Berichte der deutschen chemischen Gessellschaft 71, p. 186 et seq., 1938) that upon oxidation of equilin acetate with osmium tetroxide and hydrolysis of the osmium acid ester, a glycol is formed which carries the introduced hydroxyl groups at the carbon atoms 7 and 8 of the steroid molecule. They found further that upon hydrogenation of dihydroequilin with a so-called Raney nickel catalyst disproportioning occurs, and they isolated from the reaction mixture a dihydroequilenin and an isomer of estradiol, which they called iso-estradiol. Upon oxidation, the iso-estradiol yields iso-estrone. However, the estrogenic strength of iso-estradiol and iso-estrone is, on the average, only about ⅓ that of the estrone compounds. On the other hand, in the glycol of the equilin acetate, the estrogenic effectiveness is neutralized; in fact, a weak androgenic activity can be traced in tests on the capon comb.

Pearlman and Wintersteiner, as described in Journal of Biological Chemistry, vol. 130, pages 35 and 605, 1939, started from the glycol of equilin (the 7,8-dihydroxy derivative, as described by Serini and Logemann) and arrived at the 7-keto-estrone by splitting off water from the glycol hydroxyl groups by heating in vacuum. According to them, this compound has the steric structure of estrone. The estrogenic efficacy of this compound is, however, only $1/300$ of that of the estrone. Moreover, the 7-hydroxy-estrone which has been derived therefrom, has no higher estrogenic strength. By reduction of the 7-keto-estrone, according to Wolff-Kishner, they were able to obtain 17-desoxo-estrone which seems to be identical with that obtained from estrone by the same method.

We have now found that from compounds of the equilin type, such as equilin itself, dihydroequilin and their substitution products, the estrogenically powerful estradiol and its derivatives can be obtained. To this end, two hydroxyl groups are first added, either directly or by way of the oxide compounds, to the carbon-carbon double bond in ring B of the equilin compound, such as dihydroequilin, obtained from equilin in known manner. Thus the compound may first be converted to the oxide form and the double bond thereby saturated, after which the oxygen bridge is hydrolyzed to the 7,8-dihydroxy compound saturated in ring B. According to the process of our invention, the 17-position of the starting compound is converted into a secondary alcohol group if such group is not already present; 17-hydroxy intermediates having an oxide or glycol grouping in the 7,8 positions are thus obtained, which are then treated to convert the 7 and 8 carbons into the (in the B-ring) saturated, unsubstituted condition characteristic of estradiol. Thus, the 7,8-glycol-17-alcohol may be transformed, by splitting off the elements of water from the 7,8-glycol, into a 7-keto derivative of estradiol, after which the 7-keto oxygen is replaced with hydrogen to yield the estrogenically strongly effective estradiol. The latter conversion may be effected in various ways. Thus the 7-keto-estradiol can be reacted with a ketone reagent, like hydrazine or one of its substitution products, to yield the corresponding 7-derivative, the 7-substituent being then split off, as by heating with an alcoholate and an alcohol under pressure, the product being estradiol or its 3-derivative. Or the 7-keto-estradiol can, in another embodiment of the invention, be converted into the 17-derivative, such as the 17-ester or ether, for example to the 17-benzoate, to protect the 17-OH group, after which (or prior to the 17-substitution) the 7-keto group is reduced by catalytically activated hydrogen, or otherwise, to the 7-OH compound. The 7-OH is then replaced by halogen, such as chlorine, according to the method of Wintersteiner. The intermediate is then treated to remove hydrohalic acid, as by heating with pyridine, the unsaturated compound being then reduced by catalytically activated hydrogen to the saturated condition in ring B. By complete or partial hydrolysis, there is obtained estradiol or its 3- or 17-derivative, respectively.

The following diagram shows schematically and by way of example the reactions generally involved in our process:

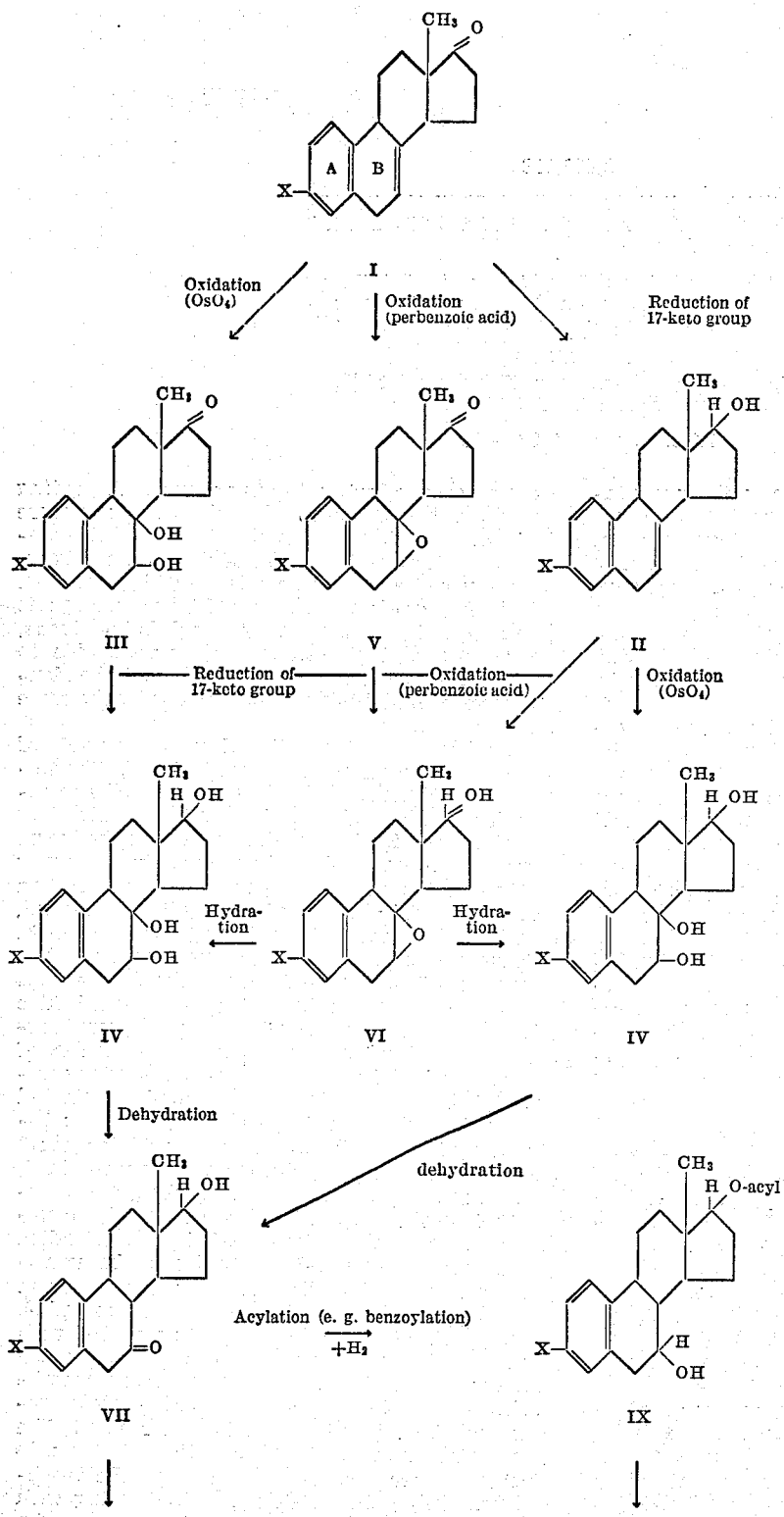

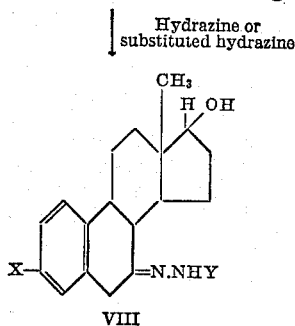

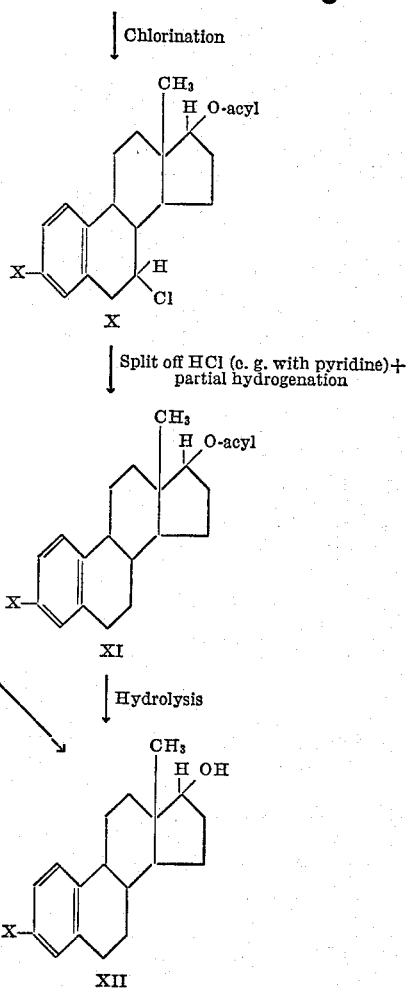

In the formulae, X represents an hydroxyl group or a group convertible thereinto, for example halogen, amino, ester, and ether groups, for instance, with the aid of hydrolysis.

As starting materials for the reaction sequence forming the subject-matter of the present invention, compounds of the type of equilin are to be considered, i. e., such steroid compounds as have, besides an aromatic ring, also a double bond in ring B, especially equilin itself and its derivatives, as, for instance, the esters, ethers, etc. (I). It is possible, however, to start directly with dihydro equilin or its derivatives (II), or with equilin glycol and its derivatives (III), no matter how produced.

The transformation of the 17-keto group of the equilin compound having, as stated, a carbon-carbon double bond in ring B, or an oxide group or two hydroxyl groups directly linked to nuclear carbon atoms in ring B, into a 17-secondary alcohol group without disturbance of the benzenoid character of ring A can be accomplished in any well-known manner. For example, the reduction may be achieved with Grignard type compounds which tend to form unsaturated hydrocarbons, such as isopropyl magnesium iodide; or by means of catalytically activated hydrogen; or by the Meerwein-Ponndorf procedure using an alcohol in conjunction with an aluminum or magnesium or other alcoholate to effect an exchange of oxidation levels, etc. The reduction of the 17-keto group of equilin and its 3-substitution products to form dihydroequilin and its derivatives can also be accomplished by the methods described in the Schwenk and Whitman Patent No. 2,072,830, issued March 2, 1937, and in the Strassberger and Schwenk application Serial No. 103,568, filed October 1, 1936; for instance, by addition of finely divided aluminum, nickel, silicon, or the so-called Raney alloys to an aqueous alkaline solution of equilin, or of the salts, esters, halides and other 3-substitution products thereof.

The oxidation to the glycol derivatives, such as Compounds III and IV of the formulae given above, may be accomplished by the method described in the Berichte publication of Serini and Logemann cited above, using for example, osmium tetroxide, peracetic acid, or hydrogen peroxide, as oxidizing agent. There may, however, also be used any other suitable method for the preparation of the glycols. Thus oxides, such as Compounds V and VI of the above formulae, can be intermediately prepared by oxidation with the aid of peroxide reagents such as perphthalic or perbenzoic acid, and then transformed by well-known hydration processes into the glycols. Mild oxidation methods of this kind are described, for instance, in Houben-Weyl, "Arbeitsmethoden der organischen Chemie," 3d edition, vol. 3, page 214 et seq. Similarly the hydration or hydrolyzation can be effected in known ways.

The splitting off of the elements of water to form the 7-keto derivatives is preferably effected by distillation of the glycol compounds in vacuo, preferably of high degree. It is also possible to proceed by boiling with glacial acetic acid, by warming with metal salts such as anhydrous copper sulfate, potassium bisulfate, or stannous chloride and, in general, according to the methods described in Houben-Weyl, supra, 3d edition, vol. 3, pages 117–119.

The 7-keto estradiol can also be prepared directly from dihydroequilin in one step. In this case of dihydro equilin in which the hydroxyl groups are protected by non-oxidizable groups which can be reconverted to hydroxyl with the aid of hydrolysis, as by ester, ether, halogen and other groups, is subjected to the action of an oxidizing agent capable of saturating the double bond between the 7 and 8 carbon atoms without rupture of the ring and with insertion of an oxygen on the 7 carbon atom. To this end, an oxidizing agent, like potassium permanganate in acetic acid solution, may be employed under the conditions described by Ehrenstein and Decker (Journal of Organic Chemistry, vol. 5, page 544); and Marker and Rohrmann (Journal Amer. Chem. Soc., vol. 62, page 516).

The replacement of the 7-keto oxygen with hydrogen atoms is preferably achieved according to the method of Wolff-Kishner using sodium or other alkali metal alcoholate, and alcohol under pressure, after condensing the keto group with hydrazine or a substitution product thereof, such as semicarbazide. Provided that the hydroxyl group in the 17-position and the benzenoid ring A are not attacked, other reduction methods can also be employed. To avoid side reactions, the 17-hydroxyl group can be intermediately protected against the attack of the reducing agent by transformation into an ester, ether, halogen or other group, etc. Such reduction methods are also well known through Houben-Weyl, supra, 3rd edition, vol. 2, page 249 et seq.

The conversion of a 7-keto estradiol into estradiol can also be accomplished by first forming the 7-enol ester, such as the acetate, followed by reduction with hydrogen in the presence of Raney nickel, to yield the 7-acyloxy estradiol. The 17-hydroxyl group may then be converted into a group such as a benzoyloxy or ether group which is less easily hydrolyzable than the acetyl group. Thereupon the compound is partially hydrolyzed to yield the 7-hydroxy compound, while the 17-hydroxyl group remains protected in the form of the ester or ether group. The 7-hydroxyl group can then be replaced with hyrogen in accordance with the steps disclosed by Pearlman and Wintersteiner, cited above.

An alternative method is to benzoylate the 7-keto estradiol and then hydrogenate the product to produce the 7-hydroxy compound. The 7-hydroxyl group is then removed according to the method of Pearlman and Wintersteiner to yield the estradiol 17-benzoate.

By procedures similar to those described hereinabove, the known compound 7-keto estrone can be converted into estradiol. Thus, this compound may be refluxed with acetic anhydride to form the 7-enol ester, the 3-hydroxyl group being simultaneously esterified. The 17-keto group remains unaffected. Hydrogenation of this product with hydrogen with the aid of a Raney nickel catalyst yields the 7-acetoxy estradiol 3-acetate. This compound is then benzoylated to yield the 17-benzoate, or it may be etherified to produce a corresponding 17-ether. In either event, partial hydrolysis of the product will produce the corresponding 7-hydroxy estradiol 17-benzoate or ether, which is then treated as above described.

We have found it particularly convenient to convert the equilin type compounds into glycol compounds of the formula IV given above, since such glycol derivatives of dihydroequilin lend themselves readily to dehydration to form the 7-keto estradiol from which estradiol itself can be easily obtained. The glycol derivative can be readily isolated if desired as the 3,7,17-triocetate derivative or as a mono-nitrobenzoate or other ester, the 3-hydroxyl being similarly or differently substituted.

The purification of the estradiol compounds obtained by the process of the invention can be effected by methods known per se, as by recrystallization, distillation, sublimation, precipitation with the proper reagents, for instance digitonin, etc.

The following examples illustrate the invention in greater detail, but are not to be considered as indicating the limits or scope thereof:

*Example 1*

1.5 grams of dihydroequilin diacetate are dissolved in 50 cc. of absolute ether and 1 gram of osmium tetroxide added. Within a short time the olive green osmium acid ester is precipitated. After standing overnight, the precipitate is filtered off and washed with ether. The precipitate is boiled for two hours with 10 grams of water-containing sodium sulfite in 25 cc. of 95% alcohol and 100 cc. of water. The sodium osmium sulfite formed is then filtered off, and the filtrate extracted with chloroform. The residue obtained by distilling off the chloroform is saponified by boiling for 1 hour with 1N methyl alcoholic potassium hydroxide solution, and the saponification liquid acidified and extracted with chloroform. The chloroform residue is the dihydroequilin glycol compound identified by the structural Formula IV given above, and is purified by recrystallization from aqueous alcohol, separating and drying.

400 mg. of the dihydroequilin glycol thus obtained are distilled in a high degree of vacuum for 5 hours at a bath temperature of 200–220° C. The 7-keto-estradiol of Formula VII is secured in good yield as a white, crystalline distillate which, recrystallized from methanol, forms beautiful white crystals.

100 mgs. of 7-keto-estradiol are boiled for two hours in 90% alcohol with an excess of semicarbazide acetate. After standing overnight at room temperaure, the semicarbazone derivative of the 7-keto-estradiol is precipitated by the addition of water, filtered off and used directly in the next step without purification. It melts at 187–188° C.

100 mgs. of the crude semicarbazone are heated to 180–190° C. in a closed tube, with a solution of 200 mgs. of sodium in 4 cc. of absolute alcohol for 12 hours. After dilution with water, the tube contents are acidified and extracted with ether. The residue, obtained after washing and evaporation of the ether and recrystallization from dilute methonol, is estradiol having a melting point of 175° C., and an estrogenic efficacy of 0.1γ per international unit.

Instead of by recrystallization from dilute methanol, the estradiol can be purified by precipitation with digitonin, or by means of chromatographic adsorption, or according to other well-known methods.

*Example 2*

To a solution of 1 gram of the 7,8-glycol derivative of equilin in hot alcohol, small pieces of sodium are added and the solution heated after each addition until each piece of sodium has dissolved. Upon completion of the reduction, the solution is diluted with water, acidified, and exhaustively extracted with chloroform. The dihydroequilin glycol of the Formula IV given above wherein X in this case is an hydroxyl group, is obtained as the residue after evaporation of the chloroform and is purified by recrystallization. The recrystallized product is transformed into estradiol with a melting point of 176° C. by splitting off the elements of water and then splitting off oxygen from the resulting 7-keto-estradiol as described in Example 1. The water may be split off from the tetrol by refluxing, by example, 100 mg. of the tetrol with 25 cc. of 8% sulfuric acid, the material going completely into solution. On cooling, the keto compound $C_{18}H_{22}O_3$ crystallizes out, and on recrystallization from water the product melts at 127–130° C.

Example 3

500 mg. of 7-keto estradiol are dissolved in 5 cc. of anhydrous pyridine and 1 cc. of freshly distilled benzoyl chloride added. The mixture is allowed to stand overnight and is then poured into dilute hydrochloric acid and the insoluble material filtered and washed with water until the filtrate is neutral. This is the 3,17 di-benzoyl-7-keto estradiol. This is dissolved in 20 cc. of methyl alcohol and reduced at substantially atmospheric pressure with hydrogen in the presence of a Raney nickel catalyst. 1 mol of hydrogen is rapidly taken up and the 7-hydroxy-3,17-dibenzoyl estradiol is isolated by filtering the alcohol solution free of the catalyst, and precipitating in water and filtering the insoluble compound. The subsequent procedure follows that outlined in the Wintersteiner publication referred to above, the final product after hydrolysis being estradiol.

The hydroxyl groups in the various starting materials, intermediate products, and final products can be converted into groups which are reconvertible into hydroxyl. Thus the hydroxyl group or groups may be replaced by ester groups, such as acetate, propionate, butyrate, valerate, benzoate, and nitrobenzoate or by ether groups, such as methoxy and ethoxy, or by halogen, or by amino, or by combinations of such groups, yielding mixed esters, ethers, ether-esters, etc.

Thus the tetra-acetate of the glycol derivative of dihydro-equilin may, for example, be prepared in the following manner: 100 mg. of the crude glycol are dissolved in 3 cc. of dry pyridine. 1.5 cc. of acetic anhydride are added and the mixture refluxed for about 3 hours. After decomposition with ice water, the mixture is taken up in ether, the ether washed in succession with 5% sulfuric acid, water, 5% sodium carbonate, and water, and then dried and concentrated. The residue crystallizes on addition of 20 cc. of hexane. The crystals melt at 206–208° C. The product is recrystallized from ether-hexane, forming stout prismatic needles of M. P. 210–211.5°.

To produce the para-nitrobenzoate, 50 mg. of dihydroequilin glycol are dissolved in 2 cc. of 10% sodium hydroxide, and a solution of 200 mg. of para-nitrobenzoyl chloride in a few drops of acetone is added. A white precipitate forms at once and the mixture becomes slightly warm. It is shaken for thirty minutes, filtered, washed with water, and dried. The product melts at 176–178° C. The suspension shows a green fluorescence with $H_2SO_4$. On recrystallization several times from alcohol, the melting point rises to 270–271° C.

The product is the monoester of the general formula $C_{25}H_{27}O_7N$.

Mixed derivatives may be obtained by, for example, first acetylating, propionylating, benzoylating, methylating, ethylating, etc., the 17-OH of dihydroequilin and thereafter treating the 7,8-glycol obtained therefrom with other acylating or etherifying agents to produce mixed derivatives of the tetrol. Thus a 17-propionate or 17-methyl ether may have in one or both of the 7 and 8 positions an acetate, benzoate, methyl ether or other group different from that at the 17-position.

We claim:

1. A process for converting a starting estratriene compound having a double bond in ring B into a compound saturated in ring B and having the nucleus and the steric configuration of estradiol, comprising saturating the double bond in ring B of the starting compound by adding thereto two hydroxyl groups at the olefinic double bond, dehydrating the product to produce the corresponding 7-keto compound, and replacing the ketonic oxygen in the 7-position with hydrogen.

2. Process for the manufacture of physiologically highly active estradiol and its 3- and 17-derivatives which can be converted into estradiol with the aid of hydrolysis, which comprises saturating the olefinic double bond of a member of the group consisting of equilin and its 3-substituents which are convertible into the 3-OH compound with the aid of hydrolysis, by adding two adjacent hydroxyl groups to ring B at such double bond, reducing the 17-keto group to an alcohol group, the said saturating and reducing steps being conducted in any order, dehydrating the product so obtained to replace the glycol group with a keto group, and thereafter replacing the ketonic oxygen in ring B with hydrogen.

3. Process according to claim 1, wherein the starting compound is equilin.

4. Process according to claim 1, wherein the starting compound is a 3-substitution product of equilin.

5. Process according to claim 1, wherein the starting compound is dihydroequilin.

6. A process for the manufacture of physiologically highly active estradiol which comprises treating a member of the group consisting of equilin 7,8 glycol and the derivatives thereof which have in the 3-position a group which can be converted into a hydroxyl group with the aid of hydrolysis, with a reducing agent to convert the 17-keto group into a secondary alcohol group; converting the glycol alcohol so obtained into the corresponding keto alcohol, the keto group being in ring B, and thereafter replacing the keto group with hydrogen.

7. Process according to claim 1, wherein the saturation is effected with the aid of osmium tetroxide and wherein the osmium acid ester formed is hydrolyzed to produce the corresponding glycol.

8. Process according to claim 1 wherein the saturation is effected with the aid of perbenzoic acid, followed by hydrolysis to produce the glycol.

9. Process according to claim 1 wherein the dehydration is effected by heating in vacuo.

10. Process for the manufacture of physiologically highly active estradiol and its 3- and 17-derivatives which can be converted into estradiol with the aid of hydrolysis, which comprises saturating the olefinic double bond in ring B of 3-X-equilin, X being a member of the group consisting of hydroxyl and groups convertible into hydroxyl with the aid of hydrolysis, by adding two adjacent hydroxyl groups to ring B at said double bond, reducing the keto group in the 17-position into an alcohol group by heating with an alcohol and a metal alcoholate, the saturating and reducing steps being conducted in any order, converting the glycol into a 7-keto group, and thereafter replacing the ketonic oxygen in ring B with hydrogen.

11. Process according to claim 1, wherein the keto group in ring B is replaced by hydrogen by condensing the same with a member of the group consisting of hydrazine and its substitution products capable of condensing with ketones, and heating the product with an alkali metal alcoholate and an alcohol under pressure.

12. Process for the manufacture of estradiol and its derivatives comprising converting a 7,8-dihydroxy estradiol to the corresponding 7-keto compound, and replacing the ketonic oxygen with hydrogen.

13. 7,8-dihydroxy estradiol.

14. 7-keto estradiol.

15. Process for the conversion of a 7-keto estrone of the formula

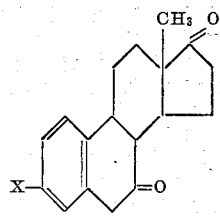

wherein X is a member of the class consisting of OH and groups convertible thereinto with the aid of hydrolysis, into estradiol, comprising reacting such 7-keto estrone with an esterifying agent to form the 7-enol ester, the ester group being one which is relatively easily split off by hydrolysis, reducing the product to form the 7-ester 17-OH compound, replacing the 17-OH with a group which is relatively difficult to split off by hydrolysis, partially hydrolyzing the tri-substituted estriol to form the 7-OH compound, and then removing the 7-OH group and replacing it with hydrogen.

ERWIN SCHWENK.
EDITH BLOCH.
BRADLEY WHITMAN.